(12) United States Patent
Morizuka et al.

(10) Patent No.: US 9,007,544 B2
(45) Date of Patent: Apr. 14, 2015

(54) DISPLAY DEVICE

(71) Applicant: Panasonic Corporation, Osaka (JP)

(72) Inventors: Yoshiaki Morizuka, Nara (JP); Taishi Saika, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/108,195

(22) Filed: Dec. 16, 2013

(65) Prior Publication Data

US 2014/0184986 A1    Jul. 3, 2014

(30) Foreign Application Priority Data

Dec. 27, 2012 (JP) ................... 2012-284181
Dec. 27, 2012 (JP) ................... 2012-284182

(51) Int. Cl.
*G02F 1/1333* (2006.01)
*G02F 1/1335* (2006.01)

(52) U.S. Cl.
CPC ............... *G02F 1/133524* (2013.01)

(58) Field of Classification Search
USPC ................................. 349/58, 62
See application file for complete search history.

(56) References Cited

U.S. PATENT DOCUMENTS 7,733,436 B2 * 6/2010 Suzuki ............... 349/58

FOREIGN PATENT DOCUMENTS

| JP | 06-342165 A | 12/1994 |
| JP | 2005-117177 A | 4/2005 |
| JP | 2007-178668 A | 7/2007 |
| JP | 2008-078925 A | 4/2008 |
| JP | 2008-244681 A | 10/2008 |
| JP | 2010-066883 A | 3/2010 |

* cited by examiner

*Primary Examiner* — Lucy Chien
(74) *Attorney, Agent, or Firm* — McDermott Will & Emery LLP

(57) ABSTRACT

A display device according to this technique includes a slanting surface provided at a lower section of a housing accommodating a display panel and slanted in a depth direction; a receiving light guide member located at the slanting surface and having an incident surface exposed from a front surface of the housing, an emitting surface for emitting light to a light receiving sensor, and a reflective surface provided between the incident surface and the emitting surface; and an emitting light guide member, located at the slanting surface and having a front emitting surface slanted so as to be substantially flush with the slanting surface, for guiding light from a light emitting diode to the front surface of the housing.

4 Claims, 10 Drawing Sheets

DISPLAY DEVICE

RELATED APPLICATIONS

This application claims the benefit of Japanese Application No. 2012-284182, filed on Dec. 27, 2012 and Japanese Application No. 2012-284181, filed on Dec. 27, 2012, the disclosure of which Application is incorporated by reference herein.

BACKGROUND OF THE INVENTION

1. Field of the Invention

The present technique relates to a thin display device such as a plasma display or a liquid crystal display.

2. Description of the Related Art

In recent years, outer design of a thin display device such as a plasma display or a liquid crystal display has been developed by further reducing the thickness in a depth direction of the display device, by reducing the width of a frame surrounding a display panel, in other words, by adopting a narrow picture-frame, or the like (see Unexamined Japanese Patent Publication No. 2005-117177).

SUMMARY OF THE INVENTION

A display device according to the present technique includes a slanting surface provided at a lower section of a housing accommodating a display panel and slanted in a depth direction; a receiving light guide member located at the slanting surface and having an incident surface exposed from a front surface of the housing, an emitting surface for emitting light to a light receiving sensor, and a reflective surface provided between the incident surface and the emitting surface; and an emitting light guide member, located at the slanting surface and having a front emitting surface slanted so as to be substantially flush with the slanting surface, for guiding light from a light emitting diode to the front surface of the housing.

DETAILED DESCRIPTION OF THE INVENTION

A display device according to an exemplary embodiment of the present technique is described below with reference to the drawings. It is noted that excessive details may not be described. For example, details of well known matters or repetitious description of substantially same configurations may not be provided in some cases. This is for avoiding unnecessary long description and for allowing those skilled in the art to easily understand the present technique.

The inventors provide the accompanying drawings and the following description in order to help those skilled in the art to sufficiently understand the present technique, and do not intend to limit the subject matter recited in claims by means of these drawings or the description.

(Entire Configuration of Display Device)

Figure 1:
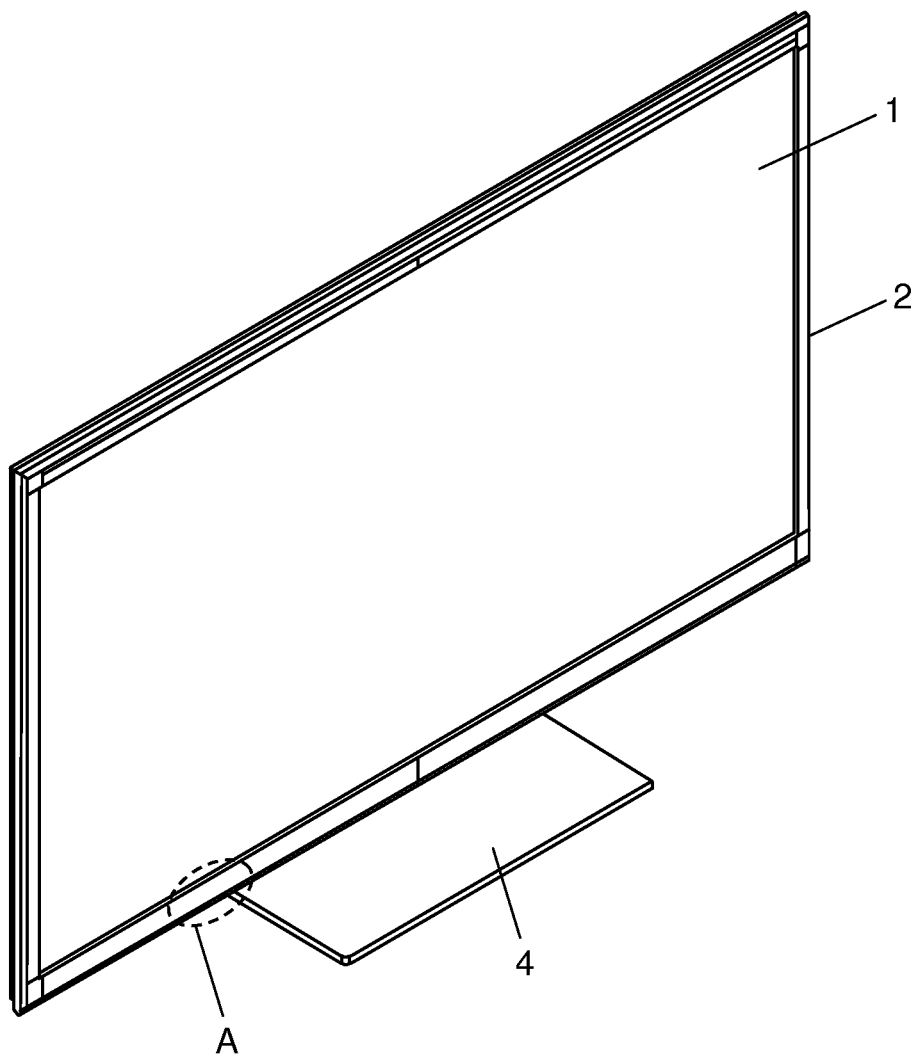
FIG. 1 is a perspective view from the front, of a display device according to an exemplary embodiment of the present technique.
Figure 2:
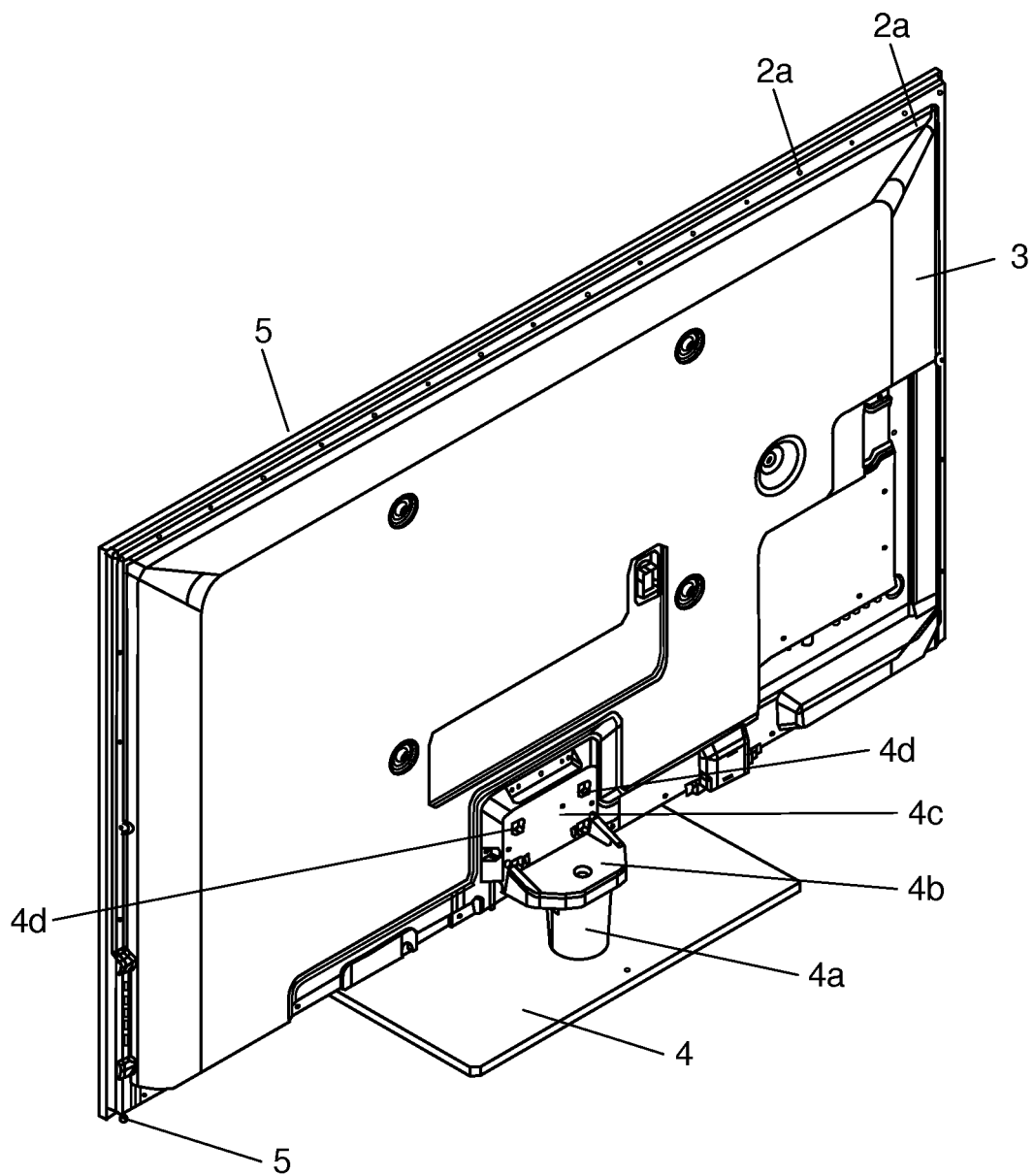
FIG. 2 is a perspective view from the rear, of the display device.

FIG. 1 is a perspective view from the front, of the display device according to the exemplary embodiment of the present technique. FIG. 2 is a perspective view from the rear, of the display device.

As shown in FIGS. 1 and 2, the display device includes display panel 1 such as a plasma display panel or a liquid crystal display panel, and a housing that has front frame 2 made of metal or resin and metal rear cover 3 and accommodates display panel 1. Front frame 2 covers a non-display region in the front surface and the side surfaces of display panel 1. Front frame 2 according to the present exemplary embodiment is formed by molding resin and is located so as to cover the side surfaces and the periphery of the front surface of display panel 1. Front frame 2 is provided with screw holes 2a that are used for fixing front frame 2 to a chassis of display panel 1.

The display device has stand 4 that is retained by the chassis of display panel 1 and rear cover 3. The display device is set vertically by stand 4. Stand 4 has post 4a, pedestal 4b provided on post 4a, mount portion 4c attached to the rear surface of rear cover 3, and screw holes 4d provided in mount portion 4c. The display device is provided, at rear cover 3, with various input terminals including an antenna input terminal, a LAN terminal, and an HDMI (registered trademark) terminal.

Moreover, front frame 2 is provided, at each of upper and lower sections, with decorative metal frame 5 having a long shape. Metal frame 5 is stuck, with a double faced adhesive tape or the like, to the inside of each of the upper and lower sections of resin front frame 2 such that an exposed surface is partially exposed outside.

Figure 3:
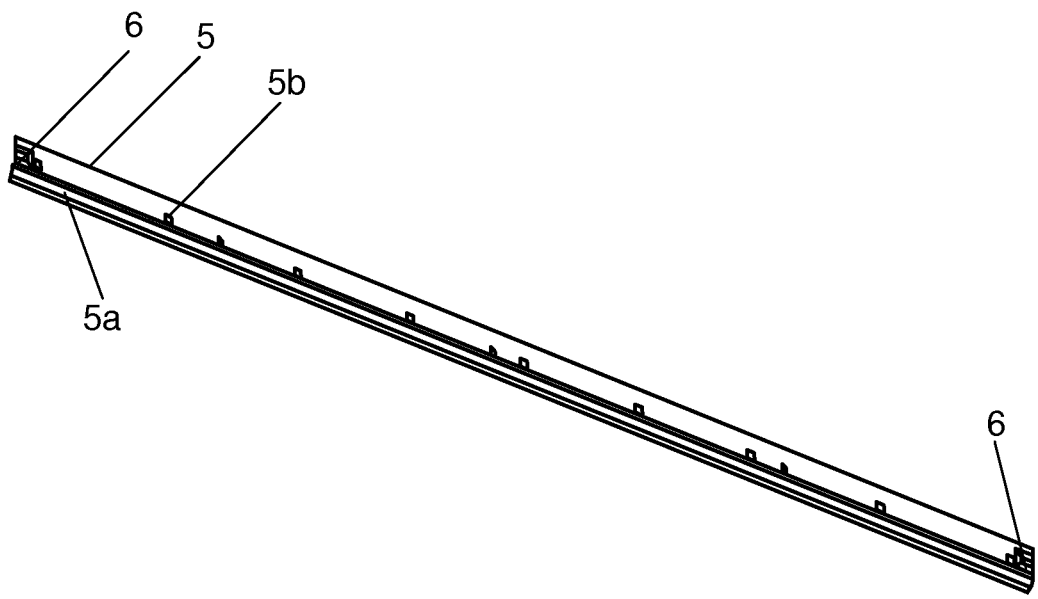
FIG. 3 is a perspective view of a decorative metal frame provided at each of upper and lower sections of a front frame.
Figure 4:
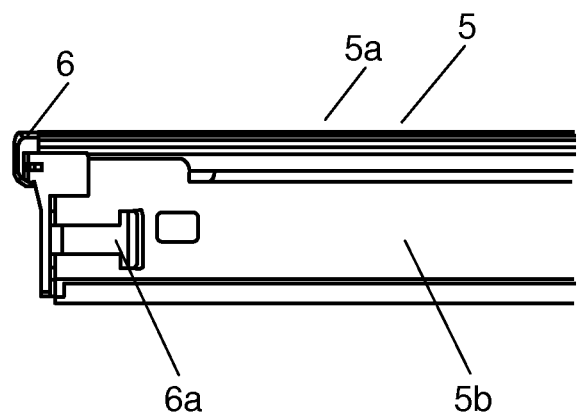
FIG. 4 is an enlarged view showing the configuration of an end of the metal frame in FIG. 3.

FIG. 3 is a perspective view of the decorative metal frame provided at each of the upper and lower sections of the front frame. FIG. 4 is an enlarged view showing the configuration of an end of the metal frame in FIG. 3.

As shown in FIGS. 3 and 4, metal frame 5 has exposed portion 5a that is exposed from front frame 2 and stuck portion 5b that is stuck to front frame 2. Metal frame 5 is molded by extrusion of aluminum and is provided, at each end, with resin molded cap 6. Cap 6 has mount portion 6a that is inserted into a groove provided in metal frame 5.

Figure 5:
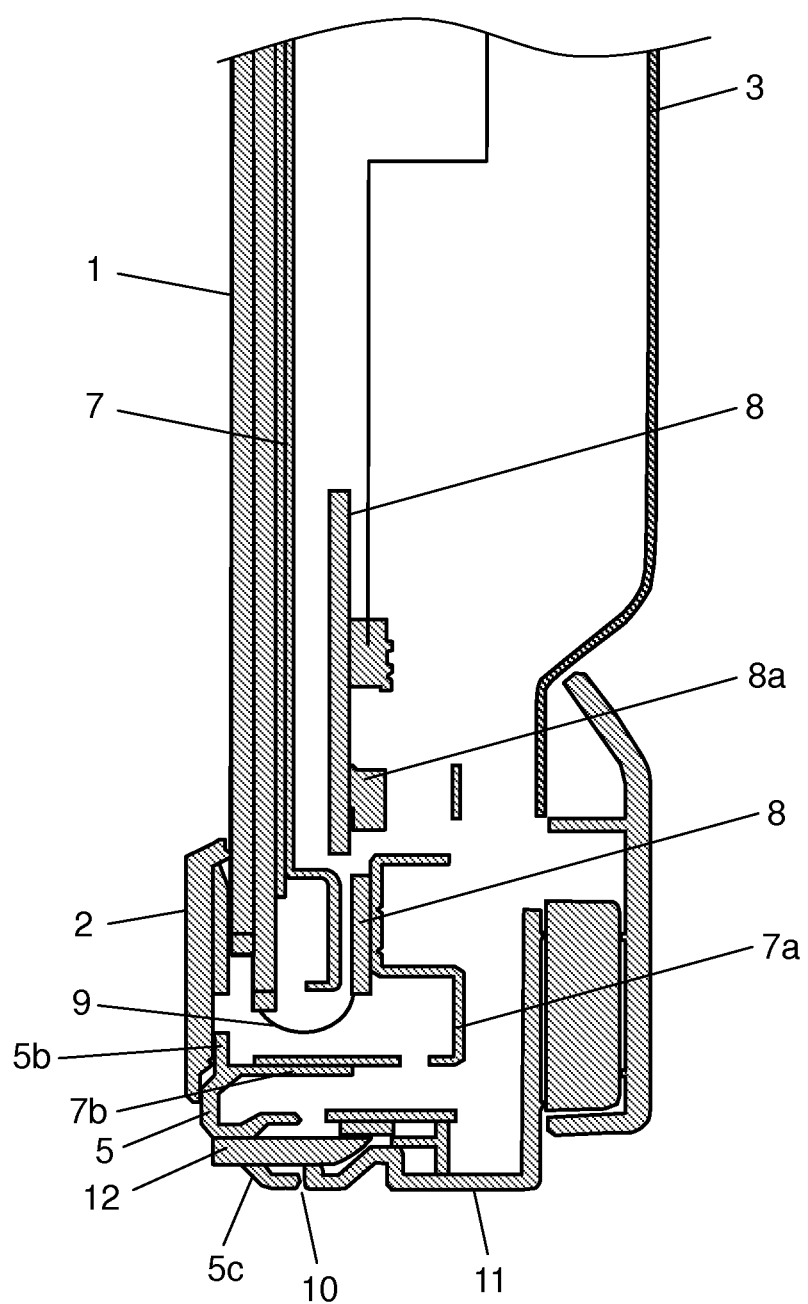
FIG. 5 is a sectional view of the display device, showing the internal structure of a lower section provided with an optical unit.

FIG. 5 is a sectional view of the display device, showing the internal structure of the lower sections provided with an optical unit. As shown in FIG. 5, display panel 1 is retained by chassis 7 and is accommodated in the housing that has front frame 2 and rear cover 3. Chassis 7 is provided with circuit board 8 that has drive circuit 8a for driving to cause display panel 1 to display images. Display panel 1 is electrically connected with circuit board 8 by way of flexible wiring board 9. Circuit board 8 connected with flexible wiring board 9 is mounted at reinforcing frame 7a that is attached to chassis 7. In FIG. 5, chassis 7 is provided, at the lower end, with mount piece 7b to which reinforcing frame 7a is attached.

Front frame 2 of the housing is provided, at the lower sections, with metal frame 5 that has slanting surface 5c slanted in a depth direction. Optical unit 10 is located at slanting surface 5c of metal frame 5. Optical unit 10 is configured such that components of optical unit 10 are located in case 11. Stuck portion 5b of metal frame 5 is coupled to chassis 7. Optical unit 10 is to be described later. FIG. 5 depicts only light guide member 12 in optical unit 10.

Figure 6:
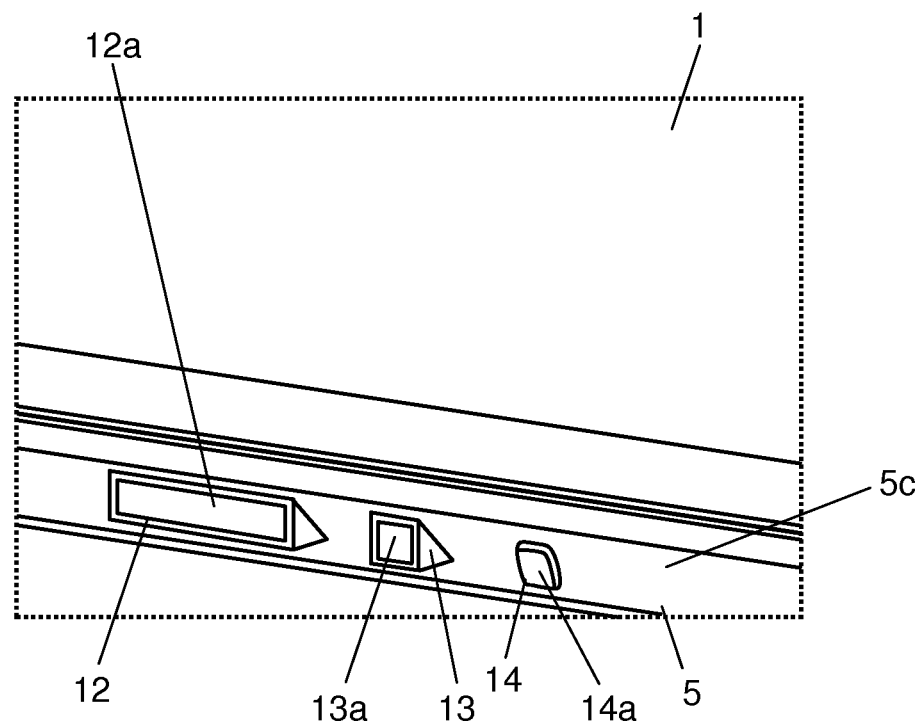
FIG. 6 is an enlarged perspective view of the optical unit at portion A indicated in FIG. 1.
Figure 7:
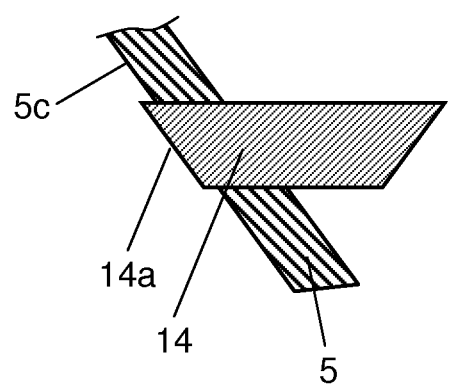
FIG. 7 is a schematic sectional view of the layout structure of an emitting light guide member in FIG. 6.

FIG. 6 is an enlarged perspective view of the optical unit at portion A indicated in FIG. 1. FIG. 7 is a schematic sectional view of the layout structure of an emitting light guide member in FIG. 6.

As shown in FIG. 6, optical unit 10 is provided with receiving light guide members 12 and 13 and emitting light guide member 14 that are exposed from the front surface of the housing of the display device. Receiving light guide member 12 is made of a light permeable resin material and receives infrared light from an infrared remote controller. Receiving light guide member 13 is made of a light permeable resin material and receives ambient light in the environment surrounding the display device. Emitting light guide member 14 is made of a light permeable resin material and guides light from a light emitting diode (LED) for indicating the operation state of the display device.

As shown in FIG. 5, receiving light guide members 12 and 13 have incident surfaces 12a and 13a that are exposed from slanting surface 5c and are located so as to be substantially parallel to a display surface of the display device.

As shown in FIGS. 6 and 7, emitting light guide member 14 has front emitting surface 14a that is slanted so as to be substantially flush with slanting surface 5c of metal frame 5. In this configuration, receiving light guide members 12 and 13 receive infrared light and ambient light at incident surfaces 12a and 13a, respectively, and are thus capable of achieving sufficient light receiving sensitivity. Meanwhile, emitting light guide member 14 guides light from the LED in red, blue, green, or the like and emits the guided light from emitting surface 14a. When emitting surface 14a is slanted so as to be substantially flush with slanting surface 5c of metal frame 5, light leaking outside from a portion other than emitting surface 14a does not stand out at emitting light guide member 14.

(Configuration of Optical Unit)

Figure 8:
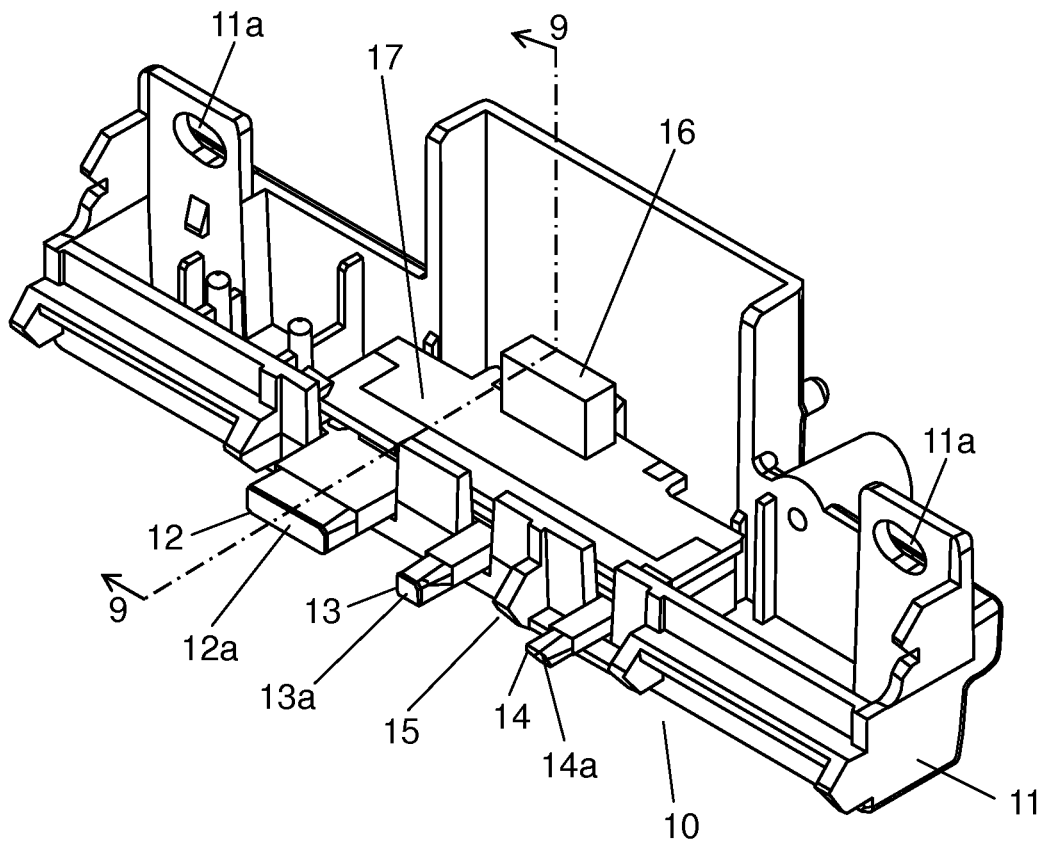
FIG. 8 is a perspective view of the optical unit included in the display device according to the exemplary embodiment of the present technique.
Figure 9:
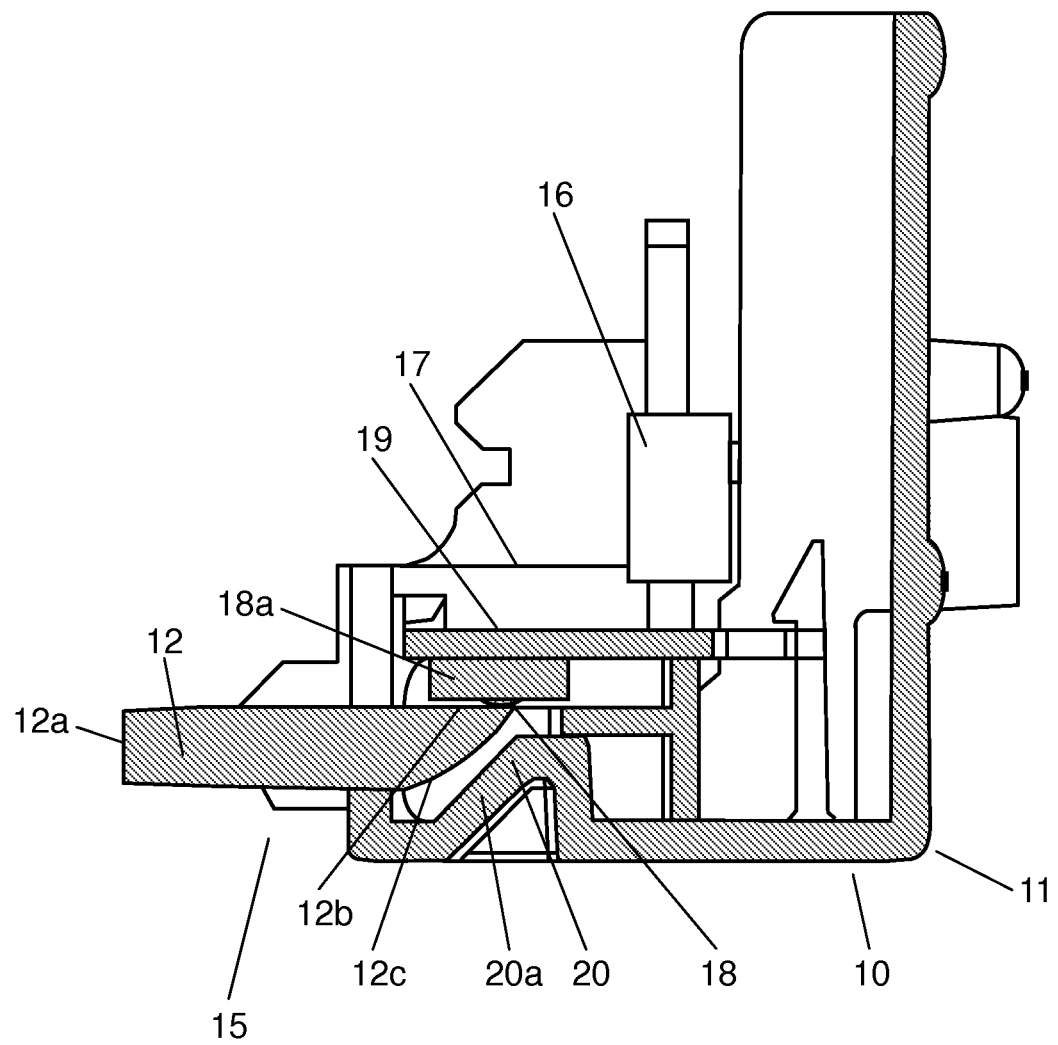
FIG. 9 is a sectional view taken along line 9-9 indicated in FIG. 8, showing the configuration of the optical unit.

FIG. 8 is a perspective view of the optical unit included in the display device according to the exemplary embodiment of the present technique. FIG. 9 is a sectional view taken along line 9-9 indicated in FIG. 8, showing the configuration of the optical unit.

As shown in FIG. 8, optical unit 10 is configured such that unit main body 15 is located at case 11. Unit main body 15 has receiving light guide members 12 and 13 and emitting light guide member 14, each of which is made of a polycarbonate or acrylic resin material that has light permeability and a prism shape. Case 11 is a molded article of black or dark resin such as ABS resin, and has mount pieces 11a that are attached to reinforcing frame 7a of chassis 7. Unit main body 15 attached to case 11 is covered with cover 17 such that connector 16 used for connection with an external electric circuit is exposed.

As shown in FIG. 9, receiving light guide member 12 has incident surface 12a at the front surface, emitting surface 12b at the rear end surface, and reflective surface 12c between incident surface 12a and emitting surface 12b. Reflective surface 12c has a slanting surface that is curved outward, and infrared light entering from incident surface 12a is reflected in receiving light guide member 12 and is guided to reflective surface 12c. The infrared light guided to reflective surface 12c is reflected by reflective surface 12c and is emitted from emitting surface 12b.

There is provided light receiving sensor 18 in front of emitting surface 12b of receiving light guide member 12. Light receiving sensor 18 is mounted on board 18a and infrared light guided by light guide member 12 enters light receiving sensor 18. Light receiving sensor 18 is mounted so as to be electrically connected to circuit board 19. Although not shown, there are mounted, on circuit board 19, a light receiving sensor such as an illuminance sensor for detecting ambient light entering from incident surface 13a of receiving light guide member 13, and an LED for emitting light in red, blue, green, or the like from emitting surface 14a of emitting light guide member 14. The light receiving sensor and the LED are electrically connected to each other. Circuit board 19 is electrically connected to the circuit board by way of connector 16. The circuit board is provided with a control circuit of the display device.

There is provided projection 20 at a position opposite to reflective surface 12c of receiving light guide member 12 on the bottom of case 11. Projection 20 has glossy reflective surface 20a that reflects incident light.

Reflective surface 12c of light guide member 12 is preferably slanted by approximately 45 degrees from the receiving surface of light receiving sensor 18 and the axis of light guide member 12.

Figure 10:
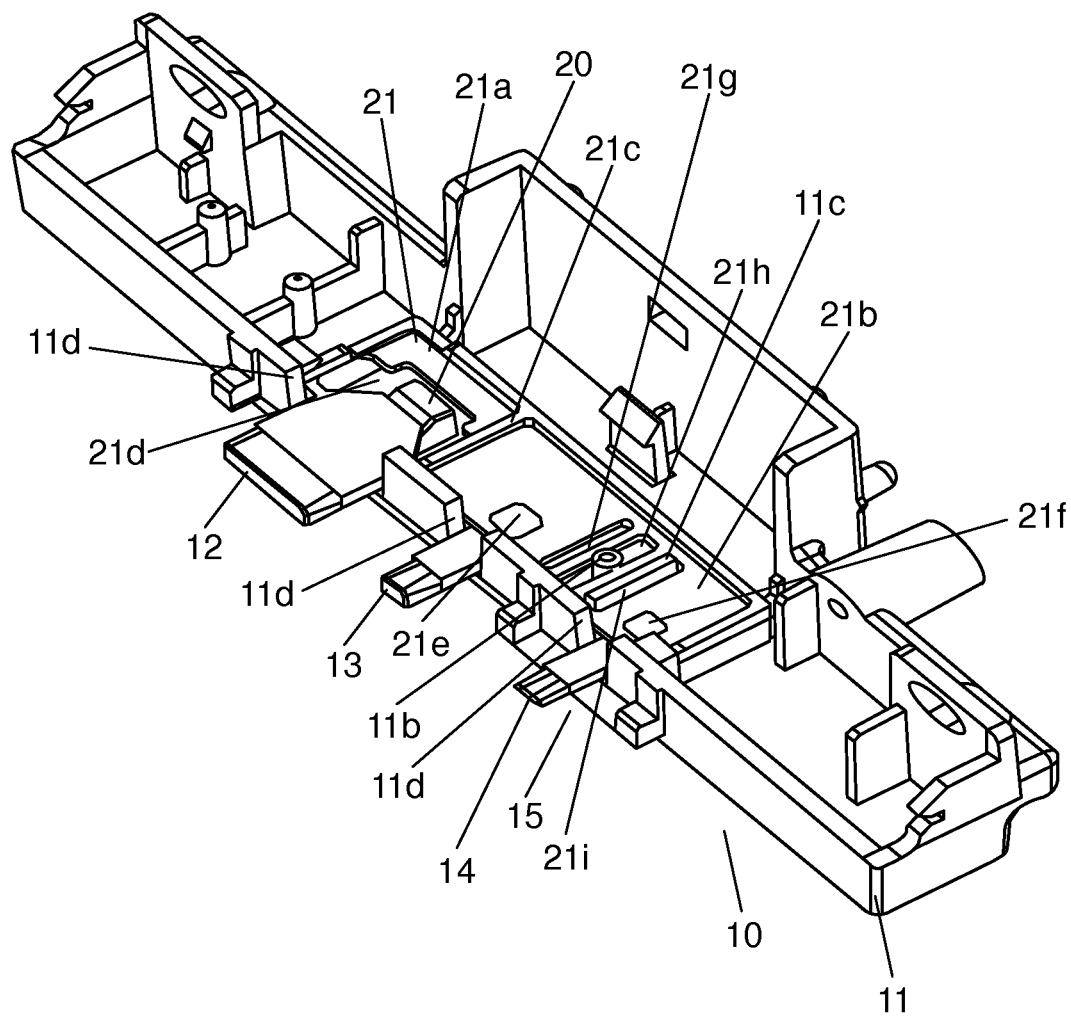
FIG. 10 is a perspective view showing the internal structure of the optical unit in a state where the cover is removed.
Figure 11:
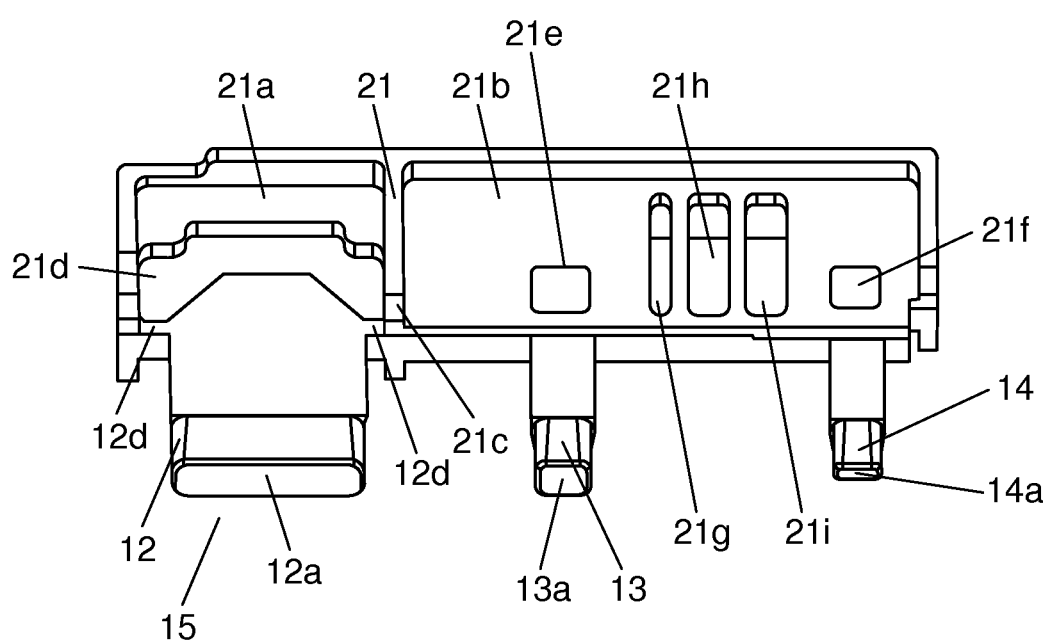
FIG. 11 is a perspective view from above, of the unit main body in the optical unit.
Figure 12:
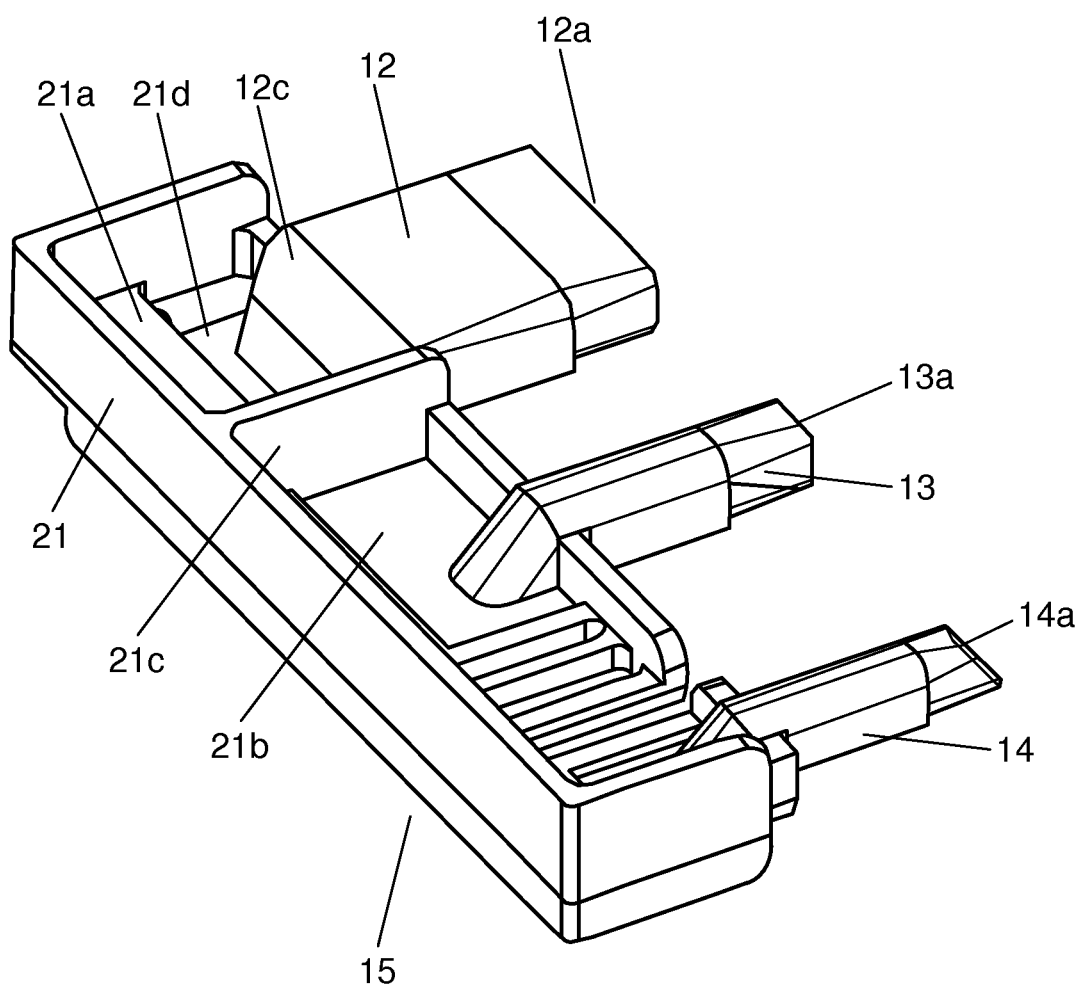
FIG. 12 is a perspective view from below, of the unit main body in the optical unit.

FIG. 10 is a perspective view showing the internal structure of the optical unit in a state where the cover is removed. FIG. 11 is a perspective view from above, of the unit main body in the optical unit. FIG. 12 is a perspective view from below, of the unit main body in the optical unit.

As shown in FIGS. 10 to 12, unit main body 15 in optical unit 10 is configured such that receiving light guide members 12 and 13 and emitting light guide member 14 are formed integrally with base 21 so as to project forward. Base 21 is made of a polycarbonate or acrylic resin material that has light permeability. Base 21 of unit main body 15 has first region 21a where receiving light guide member 12 is located and second region 21b where receiving light guide member 13 and emitting light guide member 14 are located. There is provided wall 21c between first region 21a and second region 21b.

First region 21a of base 21 has opening 21d at a position corresponding to projection 20 having reflective surface 20a of case 11. Light receiving sensor 18 is located above opening 21d. In second region 21b of base 21, sensor mount portion 21e, where a board having a light receiving sensor such as the illuminance sensor is located, is provided near the emitting surface of receiving light guide member 13. There is provided, near the incident surface of emitting light guide member 14, LED mount portion 21f where a board having the LED is located. Furthermore, second region 21b of base 21 is provided with openings 21g, 21h, and 21i between receiving light guide member 13 and emitting light guide member 14.

Case 11 of optical unit 10 is provided with columnar projection 11b and dividing plate 11c in a flat plate shape at positions corresponding to openings 21h and 21i in base 21 of unit main body 15. Projection 11b of case 11 is inserted into opening 21h in base 21 of unit main body 15, so that unit main body 15 is positioned with respect to case 11. Dividing plate 11c of case 11 penetrates opening 21i in base 21 and projects to second region 21b of base 21, so as to serve as a wall that divides sensor mount portion 21e from LED mount portion 21f which are provided in second region 21b.

Case 11 is provided, in the front surface, with openings 11d in which receiving light guide members 12 and 13 and emitting light guide member 14 in unit main body 15 are located, respectively. As shown in FIG. 10, unit main body 15 is positioned with respect to case 11 and accommodated therein so that receiving light guide members 12 and 13 and emitting light guide member 14 project forward from openings 11d in case 11.

As shown in FIG. 11, in the present exemplary embodiment, receiving light guide member 12 for receiving infrared light from the infrared remote controller is integrally coupled to base 21 while connection piece 12d provided between incident surface 12a and reflective surface 12c is interposed therebetween. Connection piece 12d is provided so as to have an area smaller than those of other portions of receiving light guide member 12. This configuration prevents infrared light guided in receiving light guide member 12 from being propagated to a different light receiving sensor such as the illuminance sensor. It is also possible to prevent deterioration in light receiving sensitivity of light receiving sensor 18 by propagation of ambient light entering receiving light guide member 13 to receiving light guide member 12. Furthermore, base 21 has wall 21c between first region 21a for receiving light guide member 12 and second region 21b for receiving light guide member 13. This configuration can further reduce interaction between infrared light guided by receiving light guide member 12 and ambient light guided by receiving light guide member 13.

In the present exemplary embodiment, case 11 has dark color and dividing plate 11c is located between sensor mount portion 21e and LED mount portion 21f which are provided in second region 21b. This configuration can shield light propagated between the LED and the illuminance sensor. It is thus possible to prevent deterioration in sensitivity of the illuminance sensor due to propagation of light emitted from the LED to the illuminance sensor.

As described above, the display device according to the present technique includes slanting surface 5c that is located at the lower section of the housing accommodating display panel 1 and is slanted in the depth direction, receiving light guide member 12 that is located at slanting surface 5c and has incident surface 12a exposed to the front surface of the housing, emitting surface 12b for emitting light to light receiving sensor 18, and reflective surface 12c provided between incident surface 12a and emitting surface 12b, and emitting light guide member 14 that is located at slanting surface 5c, guides light from the light emitting diode to the front surface of the housing, and has front emitting surface 14a slanted so as to be substantially flush with slanting surface 5c.

In this configuration, receiving light guide member 12 receives infrared light at incident surface 12a, and is thus capable of achieving sufficient light receiving sensitivity. Meanwhile, emitting light guide member 14 guides light from the LED in red, blue, green, or the like and emits the guided light from emitting surface 14a. When emitting surface 14a is slanted so as to be substantially flush with slanting surface 5c, light leaking outside from a portion other than emitting surface 14a does not stand out at emitting light guide member 14.

The above exemplary embodiment exemplarily describes optical unit 10 that is provided with receiving light guide member 12 for receiving infrared light from the infrared remote controller, receiving light guide member 13 for receiving ambient light in the environment surrounding the display device, and emitting light guide member 14 for guiding light from the LED for indicating the operation state of the display device. Unit main body 15 can be alternatively configured by at least receiving light guide member 12 and emitting light guide member 14.

Furthermore, in the above exemplary embodiment, metal frame 5 having slanting surface 5c slanted in the depth direction is attached to the lower section of front frame 2 of the housing, and optical unit 10 is located at slanting surface 5c of metal frame 5. Alternatively, front frame 2 can be provided with a slanting surface so that receiving light guide member 12 and emitting light guide member 14 can be located at the slanting surface.

The exemplary embodiment has been described above in order to exemplify the technique in the present disclosure. The accompanying drawings and the detailed description have been provided for this purpose.

In order to exemplify the technique, the constituent elements depicted in the accompanying drawings and described in the detailed description may include unessential constituent elements for achieving the object in addition to the constituent elements essential for achieving the object. It should not readily regard the unessential constituent elements as being essential just because these unessential constituent elements are depicted in the accompanying drawings or described in the detailed description.

The exemplary embodiment described above exemplifies the technique in the present disclosure, and thus can be modified, replaced, added, and removed in various manners within the scope of the claims or equivalents thereof.

What is claimed is:

1. A display device comprising:
    a slanting surface provided at a lower section of a housing accommodating a display panel and slanted in a depth direction;
    a receiving light guide member located at the slanting surface and having an incident surface exposed from a front surface of the housing, an emitting surface for emitting light to a light receiving sensor, and a reflective surface provided between the incident surface and the emitting surface; and
    an emitting light guide member, located at the slanting surface and having a front emitting surface slanted so as to be substantially flush with the slanting surface, for guiding light from a light emitting diode to the front surface of the housing.

2. The display device according to claim 1, wherein the incident surface of the receiving light guide member projects from the slanting surface and is located so as to be substantially parallel to a display surface.

3. The display device according to claim 1, further comprising an optical unit including a unit main body and a case accommodating the unit main body, the unit main body having a base formed integrally with the receiving light guide member and the emitting light guide member, wherein the optical unit is located at the slanting surface of the lower section of the housing.

4. The display device according to claim 1, wherein the receiving light guide member comprises a light guide member for guiding infrared light from an infrared remote controller and a light guide member for guiding ambient light.

\* \* \* \* \*